(12) United States Patent
Jain

(10) Patent No.: US 7,434,730 B2
(45) Date of Patent: Oct. 14, 2008

(54) PART AVAILABILITY BUSINESS PROCESS

(75) Inventor: Rajit Jain, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 292 days.

(21) Appl. No.: 11/348,603

(22) Filed: Feb. 7, 2006

(65) Prior Publication Data

US 2007/0181681 A1    Aug. 9, 2007

(51) Int. Cl.
*G06K 5/00* (2006.01)
(52) U.S. Cl. .................. 235/380; 235/385; 235/376; 705/27; 705/28
(58) Field of Classification Search .......... 235/385, 235/376; 705/27–28
See application file for complete search history.

(56) References Cited

U.S. PATENT DOCUMENTS

| | | | |
|---|---|---|---|
| 5,193,065 A | 3/1993 | Guerindon et al. | |
| 5,699,259 A | 12/1997 | Colman et al. | |
| 5,712,989 A | 1/1998 | Johnson et al. | |
| 6,594,535 B1 | 7/2003 | Costanza | |
| 6,662,076 B1 | 12/2003 | Conboy et al. | |
| 6,813,540 B2 | 11/2004 | Scotti et al. | |
| 6,970,756 B2 | 11/2005 | Levionnois | |
| 7,086,518 B1 | 8/2006 | Hranica et al. | |
| 2003/0154141 A1* | 8/2003 | Capazario et al. | 705/27 |
| 2005/0256786 A1* | 11/2005 | Sands et al. | 705/28 |

* cited by examiner

*Primary Examiner*—Michael G. Lee
*Assistant Examiner*—Kristy A Haupt
(74) *Attorney, Agent, or Firm*—Armstrong Teasdale LLP

(57) ABSTRACT

A system and method for identifying and ordering parts and monitoring inventory levels is presented. The method includes the steps of capturing identifying information from the part, identify the part from the identifying information and ordering the part from a portable device. Additional steps are having a central computer monitor inventory levels, track part request, and order replacement parts when inventory levels fall below a preset level. A system for implementing the method outlined above comprising portable devices and central computers equipped with the proper software and databases to identify the part and allow personnel to request replacements from inventory as well as monitor inventory levels and directly order replacement inventory should inventory levels fall below a preset level.

20 Claims, 3 Drawing Sheets

PART AVAILABILITY BUSINESS PROCESS

TECHNICAL FIELD

The present invention relates to part procurement and inventory distribution and management. More precisely the present invention relates to a method that allows personnel to collect identifying information about a component and ascertain availability via stand-alone portable communication devices and/or networks such as a local area network and the Internet.

BACKGROUND OF THE INVENTION

Manufacturers are continuously looking for ways to increase efficiency within their manufacturing process. In a traditional manufacturing environment a kanban system is used to distribute supplies to line workers. In a kanban system, line workers have cards at their workstation. These cards indicate to warehouse personnel the supplies needed by that particular worker. Warehouse personnel driving around on electric carts or forklifts see the cards as they pass and then retrieve and distribute the needed supplies. The kanban supply process allows businesses to maintain less inventory at workstations and helps to reduce clutter at workstations. Wired e-kanban systems are replacing the cards with display systems that are hard-wired into the assembly line automation system. E-kanbans allow workers to press a button when materials are needed.

One problem associated with kanban systems is that these systems create inefficiencies and hazards in a manufacturing facility as a result of unnecessary vehicle movement throughout the facility. There is a need to minimize vehicle movement associated with warehouse personnel simply driving around looking for a card or other signage indicating that supplies are needed. In addition, wired systems are expensive to update should the assembly line need reconfiguring. The present invention facilitates reducing nonessential vehicle movement and eliminates the hardwiring that hinders assembly line reconfiguration.

Technicians, mechanics, and other repair personnel working in the field are in constant need of replacement components. The current process for procuring replacement parts is inefficient. After receiving notification that there is a maintenance issue, repair personnel first diagnose what components need replacing. Once the defective components are located repair personnel must then identify the part. Identification of components is generally done one of three ways, where the method used generally depends upon the part. If the part is a common part (i.e. light bulb, bolt, etc.), the mechanic identifies the part through visual examination and/or from experience. For parts that may be similar but have different specification, the method of identification may come from a data plate attached to the part. For example, motors generally have data plates that indicate the motor's horsepower, voltage requirements, manufacture, etc. The last and most inefficient manner of identification requires the repair personnel to consult catalogs or other reference manuals using a part number or serial number.

Once the defective component(s) have been identified the repair personnel has to check inventory to see if the replacement components are in stock. This could entail going to a computer terminal and entering identification information, such as a part number, and searching a database. If it has been determined that the component is in stock, the repair personnel may have to call a warehouse or submit paperwork to have the component delivered. In a worst-case scenario, repair personnel my have to rummage around a warehouse only to find that the component is not in stock.

The present invention helps facilitate identifying components as well as eliminates the need for repair personnel in the field to waste time searching inventory. Additionally, the present invention can assist with inventory management, helping minimize instances when inventory is depleted or fall below acceptable reserve levels.

SUMMARY OF THE INVENTION

The present invention provides a system and method to increase efficiency in both the manufacturing and field repair environments. Searches of inventory and the ability to ascertain the availability of parts is greatly simplified with the use of wired or wireless portable devices. Maintaining levels of inventory reserves is greatly enhanced by consistently monitoring and automatically notifying personnel or automatically generating orders when levels of inventory fall below a predetermined level.

In one aspect of the present invention portable devices are coupled to database(s) and/or central computer(s) via a wireless or wired communications links. The portable devices are configured to allow personnel to quickly and efficiently identify a component, search inventory, request the part be delivered, or be advised of the location of the part for immediate retrieval. In instances where the part is not in inventory, the user may generate a request to appropriate personnel to order the part from the appropriate vendor.

In another aspect of the present invention wired and/or wireless portable devices are implemented in an assembly line setting to help minimize motorized cart or forklift traffic in a manufacturing facility. In addition, the portable devices simplify reconfiguration of assembly lines by removing the requirement of major infrastructure redesign or overhaul.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation or an implementation combining software and hardware aspects. The following detailed description is, therefore, not to be taken in a limiting sense.

The implementation is a matter of choice dependent on the performance requirements of the system implementing the embodiment. Accordingly, the logical operations making up the embodiments described herein are referred to alternatively as operations, steps or modules.

Figure 1:
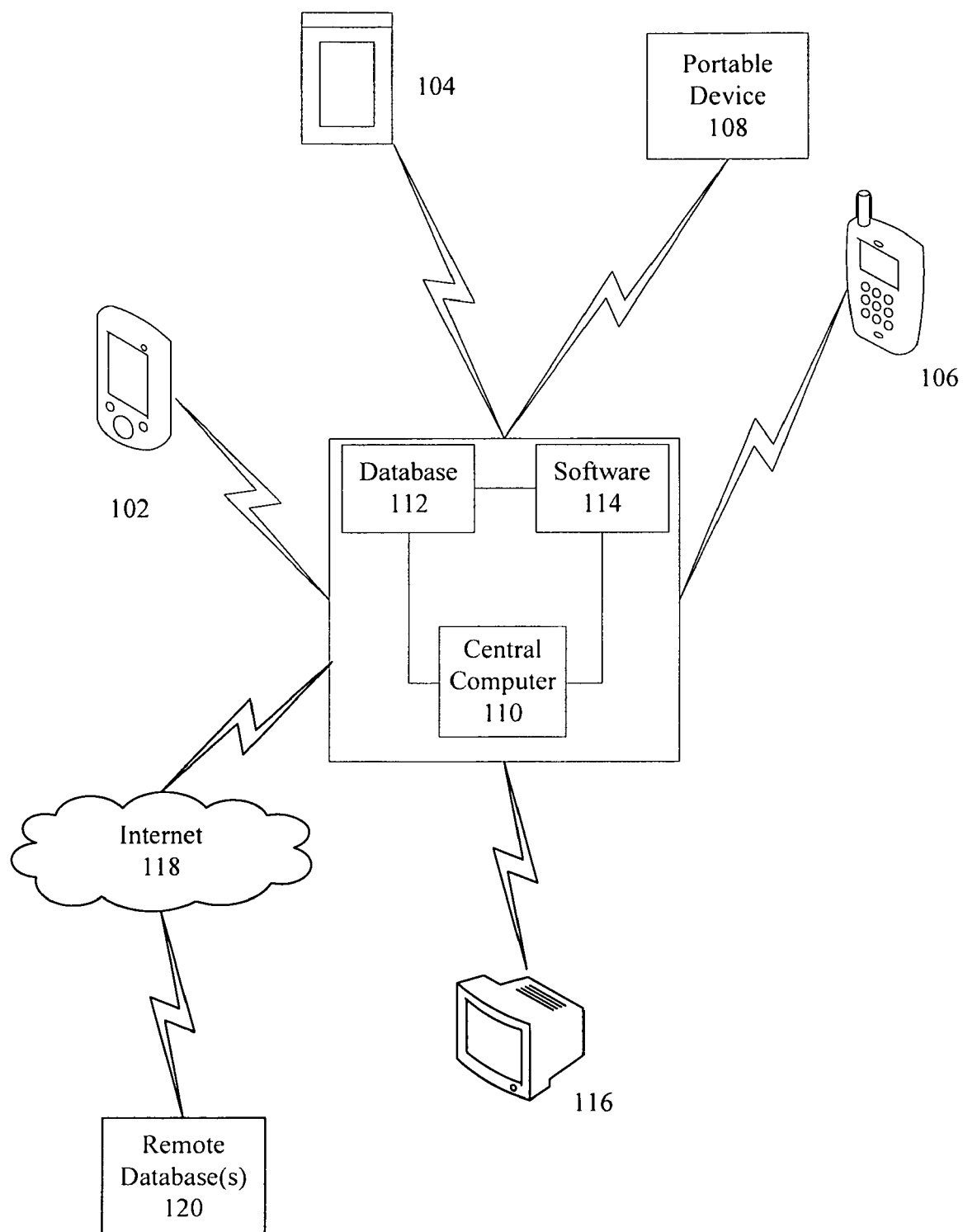
FIG. 1 depicts a system for identifying and ordering components.

Referring more particularly to the drawing, FIG. 1 depicts a system for identifying and procuring components. The system consists of portable devices including, but not limited to, portable digital assistants (PDA) 102, cellular telephones 106, scanners 104, and specialty devices 108 specifically designed per system requirements. These portable devices 108 may be wireless or wired. In addition, they may be configured to accept various types of input to assist in identifying a component. For instance, a PDA 102 may have images of various components stored within its memory and users may simply select an appropriate image. The PDA 102 may be equipped with a camera to allow a user to capture an image of a part. A non-exhaustive list of operations portable devices 108 could be configured to perform as read Radio Frequency Identification (RFID) tags, take pictures, read bar codes, scan the part (either 2-D and/or 3-D scans), allow the user to select a pre-stored image, or directly enter identifying data via methods including, but not limited to, key pads, touch screens, and voice recognition software.

Portable devices shall have the ability to transmit identification information via a wired or wireless network to a central computer 110. The central computer 110 houses database(s) 112 containing data representative of part identification, inventory levels, primary supplier or vendor, cost, manufacturer, etc. In the instance of images captured onsite by a user, the central computer 110 or the portable device 108 may implement image recognition or other software 114 to identify the part. A non-exhaustive list of examples of image recognition software are software applications similar to that found in casinos to identify customers by facial topology; software that engineers use in particle image velicometry (PIV) to map fluid flow; and software specifically written for a particular industry to identify components, such as aircraft parts, auto parts, or other equipment. In addition to portable devices, traditional computer terminals 116 can be used to accept inputs from a user. Peripherals such as digital cameras, sensors capable of reading RFID tags, etc. can be interfaced with the terminal 116 or portable devices to facilitate inputs.

It is further contemplated that barcodes could be used in a nontraditional method as a form of identification. For example, a picture could be taken of a barcode that is defaced, partially missing, or having some other defect that prohibits the barcode from being read by traditional scanning devices. The image of the defective barcode can be processes with image recognition software to "read" the barcode. It is contemplated that reading a barcode includes extracting alphanumeric data encoded in the barcoding system.

The central computer 110 can be further equipped to assist with inventory management and/or part ordering. Through communications with the central computer 110, the portable devices can be equipped with the capability for a user to order parts and have them delivered onsite or ready for immediate pickup from a warehouse or other part storage facility. Software 114 can be used to monitor and/or track inventory levels. In addition, the central computer 110 can be configured to automatically reorder parts from suppliers and/or manufactures or alert personnel that inventory is below a preset level and corrective actions are required. The central computer 110 can directly submit an order for a predetermined number or prompt a user for the number of replacements to be ordered from the primary supplier of the part via the Internet 118 or email. An alternative would be for the central computer 110 to generate a message either by email, hardcopy or other alternative means to alert the proper personnel so that purchase orders can be generated.

For example, a company sets the minimum inventory level for a widget at five. During the course of maintenance, a repairperson uses a portable device 108 to identify a part in need of replacement and orders the part from inventory. At the time the part was ordered there where five widgets in stock. Now that the repairperson has ordered the part and it has been delivered, the supply has fallen below the minimum inventory level of five. Replacements need to be ordered to bring the inventory level to an acceptable level. The central computer 110 automatically order a predetermined number of replacement widgets from an appropriate vendor.

Figure 2:
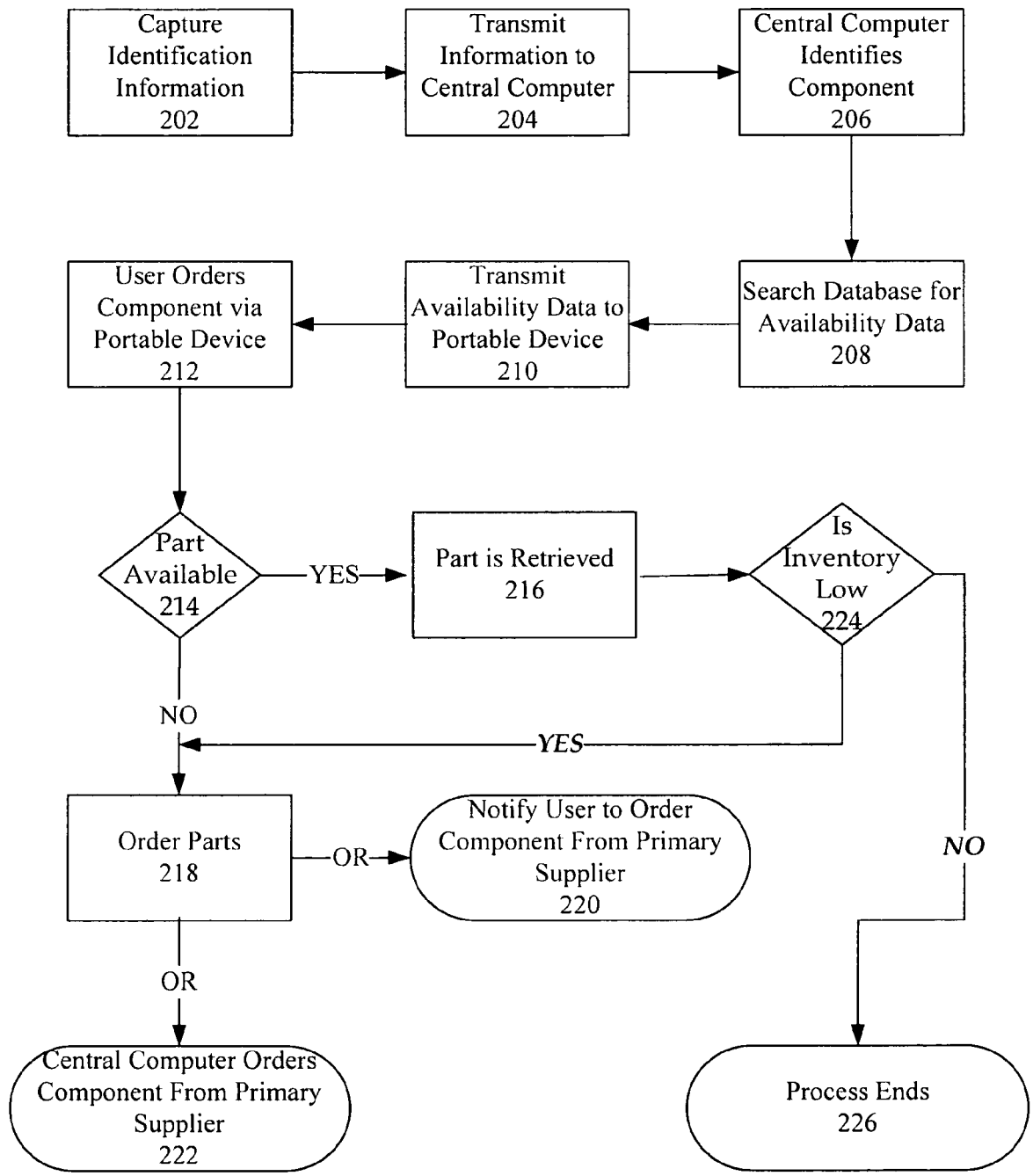
FIG. 2 depicts a process of identifying and ordering a component using a communication links and various computers.

FIG. 2 depicts a method for identifying and ordering parts as well as managing inventory. The process begins with a part being diagnosed as defective. Once the defective part is located, a portable device is used to capture identification information 202. The portable devices include, but are not limited to, PDAs 102, cellular telephones 106, 2-D and 3-D object scanners 104, and specialty devices 108 specifically designed for use with the system. The identification information may be captured by a variety of methods including, but not limited to, reading RFID tags, selecting a pre-stored image of a part from the portable device's memory, taking a picture of the device, reading of barcodes, and/or direct entry of serial and/or part numbers.

Once the identification information has been captured 202, the information is transmitted 204 to a central computer 110 where the identity of the part is determined 206. The transmission of information 204 can be either wireless or wired connections. There are a variety of methods for determining the identity of the part 206. For example, an RFID tag, stored image, barcode, or part number directly input will already have information that can be matched to records stored in a database 112 to select the proper replacement part. If an image is captured on-site via a camera or other scanning device, then image recognition or other software 114 can be implemented to determine the identity of the part 206.

After the part has been properly identified 206, the central computer 110 searches local database(s) 112 for information concerning part availability 208. It is further contemplated that the central computer may search non-local database 120 via the Internet 118. Once availability data has been found, the information is transmitted back to the portable device 210. With the availability, data the portable device 108 is configured to allow the repairperson to order the part directly from the field 212. If the part is locally available 214, it can then be retrieved directly 216 by the repairperson, delivered by warehouse personnel, or other delivery options implemented such as having the part shipped from a central warehouse or other associated facility. After ordering the part 212, the central computer 110 will update the availability database 114 and determine if inventory levels are below the minimum levels 224. If inventory levels are below minimum, then replacement inventory needs to be ordered 218. The central computer 110 may be configured to notify a user to order replacement inventory from an appropriate supplier or manufacturer 220. Alternatively, in an attempt to expedite and/or stream line the restocking process, the central computer 110 can directly submit an order 222 for a preset number of parts to bring inventories to an acceptable level or prompt a user for the number of replacements to order and then the central computer 110 will directly submit an order 222.

If the part is not available 214, either locally or from another location within the company, the part needs to be ordered 218. The central computer 110 can notify a user to order the part from a primary supplier or manufacture 220. Alternatively, in an attempt to expedite and/or stream line the restocking process, the central computer 110 can directly submit an order 222 to a supplier or manufacturer for a preset number of parts to bring supplies to an acceptable level. Alternatively, the central computer 110 may prompt a user for the number of parts to order and then directly submit the order 222. In addition, the portable device 108 can be further configured to allow the line to directly order the replacement part 222 from an appropriate vendor.

To further illustrate FIG. 2 consider the example of an airline mechanic working on an aircraft in the field. The aircraft arrives and one of its landing lights is broken. The mechanic captures identification data 202 representative of the landing light with a PDA 102 capturing an image of the landing light and transmitting the identification information 204 to a central computer 110. Utilizing image recognition software 114, the central computer 110 identifies the part 206 as a landing light and searches 208 an inventory database 112 to determine if a replacement landing light is in stock. Once the availability data has been retrieved from the database 112, the information is transmitted 210 to the mechanic's PDA 102. The mechanic orders the part 212 directly from the PDA 102 and the central computer 110 having already determined that the part is available 214, generates a message to warehouse personnel and the part is delivered to the mechanic in the field, thus saving time and increasing efficiency by allowing the mechanic to continue working while the replacement landing light is delivered directly to the mechanic versus the mechanic retrieving the part.

After the part is logged out of inventory, the central computer 110 automatically updates inventory levels and determines if inventory levels are below the minimum inventory level 224. Assuming there are five landing lights remaining in inventory and the minimum inventory level is set at five, the process ends 226. Assume that later the mechanic needs another landing light. The mechanic would again order the part 212 and it would be delivered 216. After the central computer 110 updates the inventory levels and determines that the inventory levels are below the minimum inventory level 224, replacement inventory would be ordered 218 by the central computer 110 directly ordering replacements from the manufacturer 222 or notifying warehouse personnel to order replacements 220.

Figure 3:
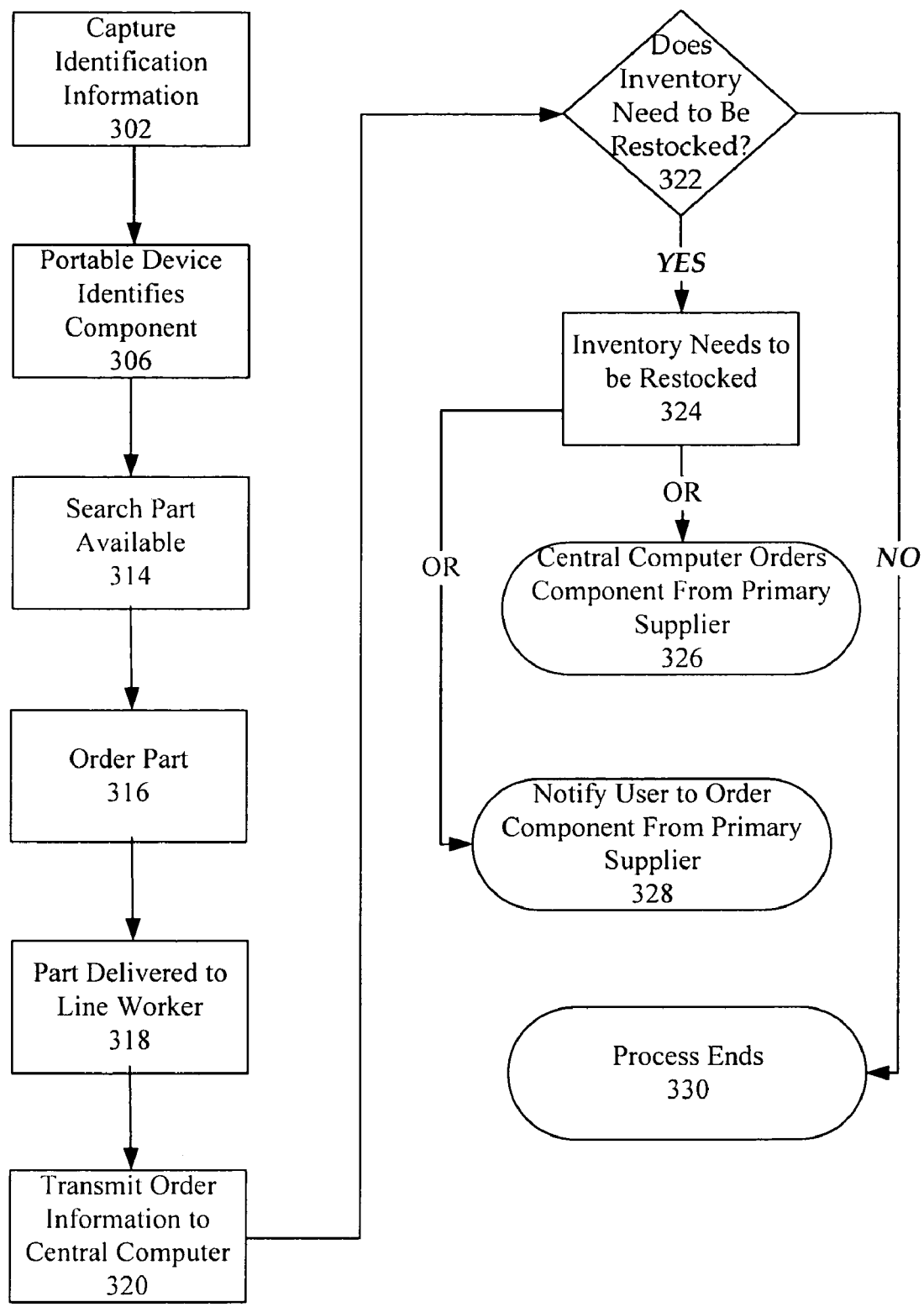
FIG. 3 depicts a process of identifying and ordering a component in an assembly line setting.

FIG. 3 depicts a method for identifying and ordering parts as well as managing inventory for possible use in manufacturing environments to replace current kanban systems. The process begins with airline personnel realizing a need for supplies. Once the need is realized a portable device is used to capture identification information 302. Possible portable devices include, but are not limited to, PDA 102, cellular telephones 106, 2-D and 3-D object scanners 104, and specialty devices 108 specifically fabricated for use with the system. The identification information may be captured by a variety of methods including, but not limited to, reading RFID tags, selecting an image of the part already stored on the portable device, taking a picture of the device, reading of barcodes, and direct entry of serial and/or part numbers.

Once the identification information has been captured 302, the portable device identifies the component 306. There are a variety of methods for determining the identity of the part 306. For example, an RFID tag, stored image, barcode, or part number directly input will already have information that can be matched to records stored in a database 112 to select the proper supplies needed. If an image is captured on-site via a camera or other scanning device, image recognition or other software 114 may be implemented to determine the identity of the part 306.

After the part has been properly identified 306, the portable device may search a database 112 stored locally on the portable device. Alternatively a search may be performed via the Internet for information concerning part availability 314. With the availability data, the portable device is configured to allow the line worker to directly order the part 326 from his workstation. Warehouse personnel can deliver the part to the line worker 316 or other delivery options may be implemented such as an automated retrieval and delivery system. After ordering the part 316 and having it delivered 318, the portable device 108 can transmit information about the transaction 320 such as the part number and quantity requested by the line worker to a central computer 110.

Once the order information is transmitted 320, the central computer 110 can then update the availability database 114 and determine if inventory levels are below the minimum levels 322. If inventory levels are below minimum levels then replacements need to be ordered 324. The central computer 110 can be configured to notify a user to order replacement inventory from an appropriate vendor 320. Alternatively, in an attempt to expedite or stream line the restocking process, the central computer 110 can directly submit an order 326 for a preset number of parts to bring supplies to an acceptable level or prompt a user for the number of parts to order and then directly submit an order 326.

To further illustrate FIG. 3 consider the example of an assembly line worker in a manufacturing facility. During the course of assembling a widget, the worker realizes he needs to restock a part used during assembly. The line worker captures identification 302 of the part with a PDA 102 by selecting a picture of the part already stored on the PDA 102. Once the correct stored picture is selected, the PDA 102 identifies the part by matching the photo's identity to a database of parts used by the assembly line during manufacturing of a widget 306.

With the part identified, the PDA 102 determines that the part is available 314 and transmits the requested number of parts 316 the line worker needs to warehouse personnel. The warehouse personnel may then deliver the part 318 to the line worker. After delivery of the part 318, the PDA 102 transmits the order information 320 to a central computer 110. Next, the central computer 110 updates the inventory records and determines if the inventory needs to be restocked 322. If the inventory in the warehouse is below a predetermined minimum inventory level, then replacement inventory needs to be ordered 324 and the central computer 110 will automatically place an order with a primary supplier 326 for a preset number of replacement parts.

Regardless of the embodiment implemented, it is contemplated that portable devices may be configured to communicate with one another via wired and/or wireless communication links. A wired link is taken to mean that communication occurs via a wire. For example, a communication link between a digital camera and a laptop occurring via a USB cable is a wired link. The portable devices may be off the shelf devices such as PDAs, cell phones, and computers (both laptop and desktop) or specialty devices designed for use with a particular system or for general use amongst various conceivable embodiments.

It is further contemplated that portable devices may communicate with one or more central computers via wired or wireless communication links. In addition, the central computers may communicate with one another via wired and/or wired communications links and the Internet. The central computers may be housed onsite and/or at remote locations. The user, vendor, manufacturer and/or other supplier may maintain databases housed on the central computers. For example, the manufacturer of a part may update a database housed on a user's central computer to reflect newer models, discontinued product, specification changes, etc.

While the present embodiment depicts the use of the present invention in use at manufacturing facility and for aircraft maintenance operations, it is further contemplated that the present invention could be implemented in other areas including, but not limited to, equipment maintenance, on navel vessels, and in warehouse purchasing.

In warehouse purchasing type applications, customers interact with service personnel to select merchandise they wish to purchase. They also order merchandise directly and have it pulled from the shelves. In addition, the customer may simply order the information from a user terminal and warehouse personnel will retrieve the merchandise for the customer.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for determining component availability and for providing delivery of such components to a user comprising the steps of:
   a. receiving component identification data at a central computer from at least one portable device, where the component identification data includes an image related to the component;
   b. identifying the component with the central computer utilizing at least the image within the component identification data;
   c. searching at least one database stored on a central computer to ascertain component availability data for the identified component; and
   d. transmitting said component availability data for the identified component from said central computer to said at least one portable device; and
   e. receiving from the portable device, and based on the component availability, a request from the user that the identified component be delivered to a location for use or retrieval by the user.

2. The method of determining component availability of claim 1, further comprising the step of allowing a user of said at least one portable device to order the identified component from inventory.

3. The method of determining component availability of claim 1, further comprising the steps of:
   a. monitoring component inventory levels for the identified component; and
   b. notifying a user if component inventory level for the identified component is below a predetermined level.

4. The method of determining component availability of claim 3, further comprising the step of generating and transmitting a request to a supplier to deliver a preset number of the identified component when said component inventory level for the identified component is below said predetermined level.

5. The method of determining component availability of claim 1, wherein said identification data is an image of the component and the step of identifying the component comprises utilizing image recognition software to identify the component from said image.

6. The method of determining component availability of claim 5, wherein at least one portable device is configured to capture said image of the component.

7. The method of determining component availability of claim 5, wherein said at least one portable device is a cellular telephone configured to capture an image.

8. The method of determining component availability of claim 1, wherein transmitting said image to said central computer is via a wireless communications link.

9. The method of determining component availability of claim 1, wherein transmitting said image to said central computer is via a wired communications link.

10. A method for determining availability of an aircraft component comprising the steps of:
    a. selecting identification data representative of the aircraft component from an image received from a portable device of a user for the purpose of identifying the aircraft component;
    b. searching a database stored on said portable device to ascertain aircraft component availability information; and
    c. relaying said aircraft component availability information to the user; and
    d. receiving a request from the portable device of the user that the aircraft component be delivered to an aircraft location for utilization by the user.

11. The method for determining component availability of claim 10, further comprising the step of allowing said user to capture an image of the aircraft component with said portable device.

12. The method for determining component availability of claim 11, further including the step of identifying the aircraft component utilizing image recognition software.

13. The method of determining aircraft component availability of claim 10, further comprising the step of allowing said user of said portable device to request the aircraft component be ordered from inventory.

14. The method of determining aircraft component availability of claim 10, wherein said portable device is a portable digital assistant.

15. The method of determining aircraft component availability of claim 10, further comprising the steps of:
    a. transmitting order information to a central computer;
    b. determining component inventory level; and
    c. generating a request to a supplier to order a preset number of the aircraft component when said component inventory level is below a preset inventory level.

16. A system for determining aircraft component availability comprising:
    a. at least one portable device operatively configured to collect aircraft component identification data;
    b. at least one database containing aircraft component availability data; and
    c. a central computer, wherein said at least one portable device transmits said collected aircraft component identification data to said central computer for searching said at least one database, and wherein said central computer transmits aircraft component availability data for an aircraft component identified from the collected aircraft component identification data to said at least one portable device, and wherein said at least one portable device transmits a request to said central computer that the aircraft component be delivered to a location of a user of said at least one portable device.

17. The system for determining component availability of claim 16, wherein said at least one portable device is a camera equipped portable digital assistant.

18. The system for determining component availability of claim 16, wherein said at least one portable device is a camera equipped cellular telephone.

19. The system for determining component availability of claim 16, wherein said central computer monitors component inventory levels and notifies a user when component inventory level decrease below a predetermined component inventory level.

20. The system for determining component availability of claim 16, wherein said central computer monitors component inventory levels and automatically transmits a request to a supplier to deliver a preset number of the component when said component inventory level is below said predetermined level.

* * * * *